UNITED STATES PATENT OFFICE 2,591,103

5-SUBSTITUTED-5-(2-THIENYL) HYDANTOINS

James J. Spurlock, Denton, Tex.

No Drawing. Application February 9, 1950, Serial No. 143,364

8 Claims. (Cl. 260—309.5)

This invention relates to 5-substituted-5-(2-thienyl) hydantoins, and their salts.

The compositions of this invention are represented by the following formula:

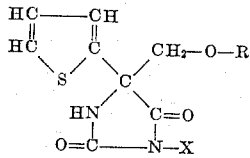

wherein R represents a cyclohexyl, phenyl or lower alkyl radical, and X represents hydrogen, or a basic salt-forming group such as an alkali metal, an alkaline-earth metal, an ammonium or a substituted ammonium radical.

The hydantoins of the present invention are white crystalline solids which are insoluble in water, but are soluble in most organic solvents. The metal salts of the hydantoins are solids and, except for the heavy metal salts, are soluble in water and quite insoluble in organic solvents. The hydantoins and their salts have valuable properties for therapeutic use as anticonvulsants.

The novel hydantoins of this invention are prepared in the following manner: A thienyl ketone having the following formula

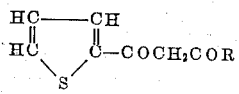

wherein R has the same significance as before, is dissolved in a suitable organic solvent such as ethanol, and to the solution are added about 1½ molecular equivalents of potassium cyanide dissolved in a small quantity of water and 3 molecular equivalents of solid ammonium carbonate. The mixture is placed in an autoclave and heated for a period of about 12–24 hours at a temperature of about 110° C. The reaction mixture is removed from the autoclave, a quantity of water is added, and most of the alcohol is evaporated off. The residue is acidified with a mineral acid, such a hydrochloric acid, which causes precipitation of the desired hydantoin. The product is purified by recrystallization from a suitable solvent or mixture of solvents.

The salts of the novel hydantoins of this invention are prepared by reacting stoichiometric quantities of the hydantoin and a base such as a metal hydroxide or an alkoxide, or a basic ammonium or substituted ammonium compound. For example, the sodium salt is prepared by reacting equal molecular proportions of sodium ethoxide and the hydantoin in ethanol solution. Other alkoxides, such as the methoxide or isopropoxide, are equally suitable. For the preparation of a substituted ammonium salt, an equimolecular quantity of the substituted ammonium base, for example, ethanolamine, or ethylenediamine, is added to an inert solvent solution of the substituted hydantoin. To obtain the dry salt, the solution is evaporated to dryness. For the preparation of therapeutically useful salts of the hydantoins, metals and ammonium radicals having an appreciable water-solubility and a low toxicity to the human body are of course preferred.

The thienyl ketones which are the intermediates used in the preparation of the novel compounds of this invention are prepared as follows: An alcohol having the formula R—OH, wherein R has the same significance as given hereinabove, is treated with formaldehyde and dry hydrogen chloride, to form the corresponding chloromethyl ether. The chloromethyl ether is converted to the corresponding nitrile by treatment with cuprous cyanide, and the nitrile is treated with thienyl magnesium bromide, whereupon the desired R-substituted thienyl ketone is formed.

The following examples are illustrative of the preparation of the novel compounds of this invention.

EXAMPLE 1

*Preparation of 5-isobutoxymethyl-5-(2-thienyl) hydantoin*

(a) PREPARATION OF ISOBUTOXYMETHYL 2-THIENYL KETONE 222.1 g. of isobutanol are mixed with 294 g. of 36 percent formaldehyde solution in a 3-neck flask fitted with a mercury seal stirrer, thermometer and gas inlet tube. The flask is cooled in an ice-salt mixture and stirred while passing in dry hydrogen chloride gas for a period of six hours, during which time the temperature is kept below 15° C. The reaction mixture upon standing separates into two layers. The organic layer, comprising chloromethyl isobutyl ether is removed and the aqueous layer is saturated with calcium chloride, whereby a further quantity of the ether is recovered. The two portions of the chloro ether are united, are washed with water, and are dried over anhydrous magnesium sulfate. The crude chloromethyl isobutyl ether thus obtained is purified by fractional distillation, the portion boiling between 120–127° C. being collected.

Chloromethyl isobutyl ether thus prepared is utilized in the preparation of isobutoxyacetonitrile, as follows: 49.3 g. of cuprous cyanide are placed in a 3-neck flask fitted with a mercury seal stirrer, dropping funnel, and reflux condenser. 60 cc. of anhydrous benzene are added and the mixture is heated to boiling. 61.3 g. of chloromethyl isobutyl ether are added dropwise with stirring over a period of 10 minutes to the boiling mixture. The reaction mixture is refluxed for about 3 hours. The mixture is cooled to about room temperature or below, and the precipitate of copper salts which has formed is filtered off and washed with anhydrous benzene. The combined filtrate and washings are evaporated to remove the benzene, and the residue, comprising isobutoxyacetonitrile, is distilled at atmospheric pressure. The portion boiling in the range of 156–160° C. is collected. Isobutoxyacetonitrile thus prepared is used in the succeeding step for the preparation of isobutoxymethyl 2-thienyl ketone. A mixture of 7.3 g. of magnesium turnings, 75 cc. of anhydrous ethyl ether, and 2 g. of 2-bromothiophene is placed in a 3-neck flask equipped with a dropping funnel, mercury seal stirrer and condenser. The mixture is heated until the reaction starts, and an additional quantity of 51 g. of 2-bromothiophene is added dropwise at such a rate that the ether is maintained in reflux. The reaction mixture is heated until all of the magnesium has dissolved, and cooled in an ice bath. A solution of 33.9 g. of isobutoxyacetonitrile in 75 cc. of anhydrous ether is added dropwise with stirring to the cooled reaction mixture. After the addition of the ether solution is completed, the reaction mixture is allowed to warm to room temperature and stirred for about 1 hour. The mixture is cooled in an ice bath, and 83 cc. of concentrated hydrochloric acid in about 100 g. of cracked ice are added to decompose any excess Grignard reagent and magnesium complex, and the mixture is stirred until the ice has melted. Upon standing, an organic layer, comprising an ether solution of isobutoxymethyl 2-thienyl ketone, separates. The ether solution is separated, is washed successively with dilute hydrochloric acid, 10 percent sodium bicarbonate solution, and water, and dried over anhydrous sodium sulfate. The ether is evaporated off and the residue, comprising isobutoxymethyl 2-thienyl ketone, is fractionally distilled in vacuo. The portion boiling in the range of 134–135° C. at 5 mm. is collected, and used for the preparation of 5-isobutoxymethyl-5-(2-thienyl) hydantoin as follows:

(b) PREPARATION OF 5-ISOBUTOXYMETHYL-5-(2-THIENYL) HYDANTOIN 19.8 g. of isobutoxymethyl 2-thienyl ketone are dissolved in 125 cc. of ethanol, and 9.7 g. of potassium cyanide dissolved in 25 cc. of water are added. To this solution are added 34.3 g. of solid ammonium carbonate, and the mixture is heated in an autoclave for 18 hours at a temperature of about 110° C. The reaction mixture is removed from the autoclave, 100 cc. of water are added and the mixture is evaporated to a volume of about 150 cc., during which time an oil begins to separate. The solution is made acid with concentrated hydrochloric acid, whereby a precipitate comprising crude 5-isobutoxymethyl-5-(2-thienyl) hydantoin separates. The precipitate is filtered off, and recrystallized from dilute ethanol. 5-isobutoxymethyl-5-(2-thienyl) hydantoin thus prepared melted at about 145–146.5° C.

In the examples to follow, the ketone employed in the preparation of the novel hydantoins is usually prepared according to the procedure described in (a) above, using the appropriate alcohol to obtain the desired ketone.

EXAMPLE 2

Preparation of 5-methoxymethyl-5-(2-thienyl) hydantoin 6.4 g. (0.041 mol) of methoxymethyl 2-thienyl ketone are dissolved in 125 cc. of ethanol, and a solution of 4.0 g. (.061 mol) of potassium cyanide in 25 cc. of water is added. To this solution is added 14.0 g. (0.123 mol) of solid ammonium carbonate, and the mixture is heated in an autoclave for about 18 hours at a temperature of about 110° C. The reaction mixture is removed, about 100 ml. of water added and the mixture evaporated to a volume of about 150 ml. This residue is acidified with concentrated hydrochloric acid, whereupon a precipitate comprising 5-methoxymethyl-5-(2-thienyl) hydantoin is formed. The somewhat oily precipitate solidifies on standing, and is filtered off and recrystallized from dilute alcohol. 5-methoxymethyl-5-(2-thienyl) hydantoin thus prepared melted at about 198–199° C.

EXAMPLE 3

Preparation of 5-ethoxymethyl-5-(2-thienyl) hydantoin

A solution of 14.2 g. (0.1 mol) of ethoxymethyl 2-thienyl ketone in 140 cc. ethanol is mixed with a solution of 9.7 g. (0.15 mol) of potassium cyanide in 25 cc. of water, and 34.2 g. (0.3 mol) of ammonium carbonate are added. The mixture is heated in an autoclave for about 20 hours at about 110° C. Separation and purification of the product are carried out in the same manner as described in Example 1 (b). 5-ethoxymethyl-5-(2-thienyl) hydantoin melted at 235–236° C.

EXAMPLE 4

Preparation of 5-n-propoxymethyl-5-(2-thienyl) hydantoin

A solution of 18.4 g. (0.1 mol) of n-propoxymethyl 2-thienyl ketone in 170 cc. of alcohol is mixed with 9.7 g. (0.15 mol) of potassium cyanide dissolved in 25 cc. of water, and 34.3 g. (0.3 mol) of ammonium carbonate are added. The mixture is heated in an autoclave at about 110° C. for 20 hours, and the hydantoin is recovered and purified as in Example 1 (b). 5-n-propoxymethyl-5-(2-thienyl) hydantoin thus prepared melted at 163–164.5° C.

EXAMPLE 5

Preparation of 5-isopropoxymethyl-5-(2-thienyl) hydantoin 5-isopropoxymethyl-5-(2-thienyl) hydantoin is prepared according to the procedure set out in Example 1 (b), except that 14.0 g. (0.076 mol) of isopropoxymethyl 2-thienyl ketone, 7.4 g. (0.114 mol) of potassium cyanide and 26.0 g. (0.228 mol) of ammonium carbonate in 200 cc. of approximately 80 percent ethanol are used. 5-isopropoxymethyl-5-(2-thienyl) hydantoin thus prepared melted at 157–158° C.

EXAMPLE 6

Preparation of 5-n-butoxymethyl-5-(2-thienyl) hydantoin 5-n-butoxymethyl-5-(2-thienyl) hydantoin is prepared according to the method set forth in Example 1 (b), except that 19.8 g. (0.1 mol) of n-butoxymethyl 2-thienyl ketone, 9.7 g. (0.15 mol) of potassium cyanide, and 34.3 g. (0.3 mol) of ammonium carbonate, in 200 cc. of approximately 80 percent ethanol, are used, and the mixture is heated for 12 hours at a temperature of about 110° C. 5-n-butoxymethyl-5-(2-thienyl) hydantoin thus prepared melted at 113–114.5° C.

EXAMPLE 7

*Preparation of 5-sec.-butoxy-5-(2-thienyl) hydantoin*

19.8 g. (0.1 mol) of sec.-butoxymethyl 2-thienyl ketone, 9.7 g. (0.15 mol) of potassium cyanide, and 34.3 g. (0.3 mol) of ammonium carbonate are reacted in a mixture of 140 cc. of ethanol and 25 cc. of water as solvents, in the manner described in Example 1 (b). 5-sec.-butoxymethyl-5-(2-thienyl) hydantoin thus prepared melted at 148–149° C.

EXAMPLE 8

*Preparation of 5-n-amoxymethyl-5-(2-thienyl) hydantoin*

5-n-amoxymethyl-5-(2-thienyl) hydantoin is prepared in the same manner as described in Example 1 (b), except that 21.2 g. (0.1 mol) of n-amoxymethyl 2-thienyl ketone, 9.7 g. (0.15 mol) of potassium cyanide, and 34.3 g. (0.3 mol) of ammonium carbonate are used. 5-n-amoxymethyl-5-(2-thienyl) hydantoin thus prepared melted at 121.5–122.5° C.

EXAMPLE 9

*Preparation of 5-isoamoxymethyl-5-(2-thienyl) hydantoin*

5-isoamoxymethyl-5-(2-thienyl) hydantoin is prepared according to the method set out in Example 1 (b), except that 21.2 g. (0.1 mol) of isoamoxymethyl 2-thienyl ketone, 9.7 g. (0.15 mol) of potassium cyanide, and 34.3 g. (0.3 mol) of ammonium carbonate are used. 5-isoamoxymethyl-5-(2-thienyl) hydantoin thus prepared melted at 142.5–144° C.

EXAMPLE 10

*Preparation of 5-n-hexoxymethyl-5-(2-thienyl) hydantoin*

5-n-hexoxymethyl-5-(2-thienyl) hydantoin is prepared according to the method set out in Example 1 (b), except that 22.6 g. (0.1 mol) of n-hexyl 2-thienyl ketone, 9.7 g. (0.15 mol) of potassium cyanide, and 34.3 g. (0.3 mol) of ammonium carbonate are used. 5-n-hexoxymethyl-5-(2-thienyl) hydantoin thus prepared melted at 125–126° C.

EXAMPLE 11

*Preparation of 5-cyclohexoxymethyl-5-(2-thienyl) hydantoin*

5-cyclohexoxymethyl-5-(2-thienyl) hydantoin is prepared according to the procedure set out in Example 1 (b), except that 22.4 g. (0.1 mol) of cyclohexoxymethyl 2-thienyl ketone, 9.7 g. (0.15 mol) of potassium cyanide, and 34.3 g. (0.3 mol) of ammonium carbonate are used. 5-cyclohexoxymethyl-5-(2-thienyl) hydantoin thus prepared melted at 171.5–172.5° C.

EXAMPLE 12

*Preparation of 5-phenoxymethyl-5-(2-thienyl) hydantoin*

5-phenoxymethyl-5-(2-thienyl) hydantoin is prepared in the same manner as set out in Example 1(b), except that 21.8 g. (0.1 mol) of phenoxymethyl 2-thienyl ketone, 9.7 g. (0.15 mol) of potassium cyanide, and 34.3 g. (0.3 mol) of ammonium carbonate are used. 5-phenoxymethyl-5-(2-thienyl) hydantoin thus prepared melted at 180–181° C.

EXAMPLE 13

*Preparation of the sodium salt of 5-methoxymethyl-5-(2-thienyl) hydantoin*

To a solution of 22.6 g. (0.1 mol) of 5-methoxymethyl-5-(2-thienyl) hydantoin is added a solution of sodium ethoxide prepared by dissolving 2.3 g. (0.1 mol) of sodium in 40 cc. of absolute ethanol. The reaction mixture is then evaporated to dryness in vacuo. To insure the removal of traces of alcohol the residue is heated under vacuum on a steam bath. The residue is the sodium salt of 5-methoxymethyl-5-(2-thienyl) hydantoin. Other alkali metal salts, such as the potassium and lithium salts of 5-methoxymethyl-5-(2-thienyl) hydantoin are prepared in a similar manner except that potassium ethoxide or lithium ethoxide is employed instead of the sodium ethoxide.

EXAMPLE 14

*Preparation of the calcium salt of 5-isobutoxymethyl-5-(2-thienyl) hydantoin*

To a solution of 26.8 g. (0.1 mol) of 5-isobutoxymethyl-5-(2-thienyl) hydantoin in 250 cc. of absolute ethanol is added a solution of calcium ethoxide prepared by dissolving 2.04 g. (0.05 mol) of calcium in 125 cc. of absolute alcohol. The reaction mixture is then evaporated to dryness in vacuo, removing the last traces of alcohol by heating the residue in vacuo on a steam bath. The residue is the calcium salt of 5-isobutoxymethyl-5-(2-thienyl) hydantoin. Other alkaline-earth metal salts, such as the magnesium salt of 5-isobutoxymethyl-5-(2-thienyl) hydantoin, are prepared in a similar manner using the appropriate metal alkoxide.

EXAMPLE 15

*Preparation of the ethanolamine salt of 5-ethoxymethyl-5-(2-thienyl) hydantoin*

To a solution of 48 g. (0.2 mol) of 5-ethoxymethyl-5-(2-thienyl) hydantoin in 200 cc. of absolute ethanol is added a solution of 9.8 g (0.2 mol) of ethanolamine in 50 cc. of absolute ethanol. The reaction mixture is evaporated to dryness in vacuo, on a steam bath. The residue comprises the ethanolamine salt of 5-ethoxymethyl-5-(2-thienyl) hydantoin.

Other alkanolamine salts, such as the propanolamine salt of 5-ethoxymethyl-5-(2-thienyl) hydantoin are prepared in a similar manner save that the appropriate alkanolamine is employed instead of ethanolamine. Thus salts are prepared in the same manner as set forth above from ethylene diamine, propylene-diamine, tributylamine and the like.

I claim:

1. A 5-substituted-5-(2-thienyl) hydantoin represented by the formula $$\begin{array}{c} HC\!=\!\!=\!\!CH \\ HC\diagdown\!\!\!\!\diagup C\diagdown\!\!\!CH_2\!-\!O\!-\!R \\ S \quad C \\ CH \diagdown CO \\ CO\!-\!N\!-\!X \end{array}$$

wherein R represents a radical of the group consisting of cyclohexyl, phenyl and lower alkyl radicals, and X represents a member of the class consisting of hydrogen and basic salt-forming groups having a low toxicity to the human body.

2. A 5-substituted - 5 - (2 - thienyl) hydantoin represented by the formula

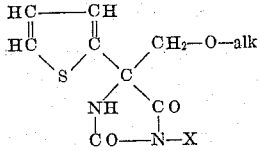

wherein alk represents a lower alkyl radical, and X represents a basic salt-forming group having a low toxicity to the human body.

3. A 5-substituted - 5 - (2 - thienyl) hydantoin represented by the formula

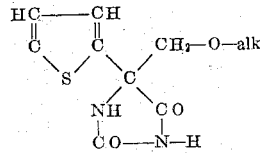

wherein alk represents a lower alkyl radical.

4. A 5-substituted - 5 - (2 - thienyl) hydantoin represented by the formula

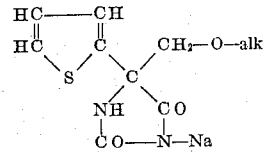

wherein alk represents a lower alkyl radical.

5. 5 - n - propoxymethyl-5-(2-thienyl) hydantoin.
6. 5-n-butoxymethyl-5-(2-thienyl) hydantoin.
7. 5 - isopropoxymethyl-5-(2-thienyl) hydantoin.
8. 5-phenoxy-methyl-5-(2-thienyl) hydantoin.

JAMES J. SPURLOCK.

REFERENCES CITED

The following references are of record in the file of this patent:

UNITED STATES PATENTS

| Number | Name | Date |
| --- | --- | --- |
| 2,327,890 | Henze | Aug. 24, 1943 |
| 2,366,221 | Spurlock | Jan. 2, 1945 |
| 2,468,168 | Bywater | Apr. 26, 1949 |

OTHER REFERENCES

Bernthsen and Sudborough: Org. Chem., p. 549, Van Nostrand, N. Y., 1925 (1922 ed.).

Whitmore: Org. Chem., pp. 884, 893, Van Nostrand, N. Y., 1937.

Richter: Org. Chem., pp. 649, 650, Wiley, N. Y., 1938.

Lands: Proc. Soc. Exp. Bio. Med. 57, 55–56 (1944).

Alles: J. Pharm. Exp. Ther. 72, 265 (1941).

Powers: Advancing Fronts in Chemistry, vol. II, p. 33, Reinhold Pub. Co., N. Y., 1946.

Caesar and Sachanen: Ind. Eng. Chem. 40, 922 (1948).

Ex parte Bywater 83 U. S. P. Q. 4.

Merrit et al.; J. Pharmacol. 84, 67–73 (1945).